US008645359B2

(12) United States Patent  (10) Patent No.: US 8,645,359 B2
Heimendinger  (45) Date of Patent: Feb. 4, 2014

(54) PROVIDING ASSOCIATIONS BETWEEN OBJECTS AND INDIVIDUALS ASSOCIATED WITH RELEVANT MEDIA ITEMS

(75) Inventor: Scott Martin Heimendinger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 12/895,673

(22) Filed: Sep. 30, 2010

(65) Prior Publication Data

US 2012/0084276 A1  Apr. 5, 2012

(51) Int. Cl.
G06F 7/00 (2006.01)
G06F 17/30 (2006.01)
G06F 17/00 (2006.01)

(52) U.S. Cl.
USPC ............ 707/722; 707/736; 707/914; 707/915

(58) Field of Classification Search
USPC .................... 707/722, 737, 999.001–999.005
See application file for complete search history.

(56) References Cited

U.S. PATENT DOCUMENTS

| 7,062,509 | B1 | 6/2006 | Nenov et al. .......................... 1/1 |
| 7,627,502 | B2 * | 12/2009 | Cheng et al. .................. 705/27.2 |
| 7,716,157 | B1 * | 5/2010 | Bourdev et al. ........ 707/999.002 |
| 7,949,191 | B1 * | 5/2011 | Ramkumar et al. .......... 382/209 |
| 8,010,402 | B1 * | 8/2011 | Sharma et al. ................ 705/7.29 |
| 2002/0069101 | A1 * | 6/2002 | Vincent ............................ 705/10 |
| 2006/0020523 | A1 * | 1/2006 | Song ................................ 705/27 |
| 2006/0085477 | A1 * | 4/2006 | Phillips et al. ............. 707/104.1 |
| 2007/0005571 | A1 * | 1/2007 | Brewer et al. ..................... 707/3 |
| 2007/0158417 | A1 | 7/2007 | Brewington ................... 235/383 |
| 2007/0172155 | A1 * | 7/2007 | Guckenberger .............. 382/305 |
| 2008/0002893 | A1 * | 1/2008 | Vincent et al. ................ 382/229 |
| 2008/0002914 | A1 * | 1/2008 | Vincent et al. ................ 382/299 |
| 2008/0159622 | A1 * | 7/2008 | Agnihotri et al. ............. 382/157 |
| 2008/0279481 | A1 | 11/2008 | Ando ............................. 382/306 |
| 2009/0094260 | A1 * | 4/2009 | Cheng et al. .................. 707/100 |
| 2009/0122198 | A1 * | 5/2009 | Thorn .......................... 348/715 |
| 2009/0287655 | A1 * | 11/2009 | Bennett ............................. 707/3 |
| 2010/0076867 | A1 * | 3/2010 | Inoue et al. ...................... 705/27 |
| 2010/0092089 | A1 | 4/2010 | Meiring et al. ............... 382/184 |
| 2010/0325015 | A1 * | 12/2010 | Westphal ........................ 705/27 |
| 2011/0022529 | A1 * | 1/2011 | Barsoba et al. ............... 705/319 |

OTHER PUBLICATIONS

Pixazza "Product in the Picture" Service: AdSense for Images—Posted by Rob Hof on Mar. 25, 2009, 15 pages. http://www.businessweek.com/the_thread/techbeat/archives/2009/03/pixazzaproductin_the_picture_service_adsensefor_images.html.

(Continued)

Primary Examiner — Kannan Shanmugasundaram
(74) Attorney, Agent, or Firm — Merchant & Gould

(57) ABSTRACT

In an embodiment, a computer-implemented method uses one or more search references to identify media items that correspond with the one or more search references and one or more individuals associated with each media item. The method of one embodiment provides a searching and identification service that uses one or more images as one or more search key inputs to identify relevant images of a media collection, including associating information of any depicted individuals with search key inputs. In one embodiment, a computing system operates to provide an association, reporting, and/or display service as part of managing an asset by using one or more search references to search through an image collection as part of determining how a product or service is being used by characterizing an association between each individual associated with the image and the one or more search references.

18 Claims, 7 Drawing Sheets

(56) References Cited

OTHER PUBLICATIONS

TinEye: identify image usage on the web—by: Michael Garmahis on May 23, 2008, 2 pages. http://garmahis.com/news/tineye-identify-image-usage-on-the-web/.

Reihe Informatik—(1995), Stephan Fischer et al., Automatic Recognition of Film Genres, 14 pages.

Irfanullah et al., Semantic Multimedia Annotation: Text Analysis—. International Journal of Digital Content Technology and its Applications, vol. 3, No. 2, Jun. 2009, 5 pages. http://www.aicit.org/jdcta/ppl/jdcta_version10_Part22.pdf.

Chinese 1st Office Action in Application 20111030789.X, mailed Mar. 22, 2013, 10 pgs.

* cited by examiner

PROVIDING ASSOCIATIONS BETWEEN OBJECTS AND INDIVIDUALS ASSOCIATED WITH RELEVANT MEDIA ITEMS

BACKGROUND

Computing and networking advancements have enabled the continued success of the online application environment paradigm, such as collaboration and social networking application environments. For example, online social networks are now capable of capturing a wealth of demographic information that can be used for various purposes. For example, certain contributing user information may be sold and marketed to companies trying to market their products or services in a targeted way. With such a vast wealth of information it becomes difficult to manage and police how company products and/or services are being used and/or portrayed. Unfortunately, each company may need to perform expensive and time-consuming studies to determine how certain company assets are being used or associated, such as how a design or logo for a brand or product line is being depicted for example. Complexities and cost compound with scale and managing every use of or association with a brand can become prohibitively expensive.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide identification and/or reporting features as part of managing aspects of a product and/or service, but are not so limited. In an embodiment, a computer-implemented method uses one or more search references to identify media items that correspond with the one or more search references and one or more individuals associated with each media item. The method of one embodiment provides a searching and identification service that uses one or more images as one or more search key inputs to identify relevant images of a media collection, including associating information of any depicted individuals with search key inputs. In one embodiment, a computing system operates to provide an association, reporting, and/or display service as part of managing an asset by using one or more search references to search through an image collection as part of determining how a product or service is being used by characterizing an association between each individual associated with the image and the one or more search references. Other embodiments are included and available.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide systems, methods, and other operational features and functionality that operate to provide reporting and other services based in part on search key identification process using data representations or structures associated with some information repository. In an embodiment, a computing system includes an image processing and reporting engine that uses one or more search key inputs or references to locate relevant images included as part of an online repository. The computing system of one embodiment can operate to identify relevant media items based in part on comparisons of aspects of a search key input with portions of media items contained in a storage collection. For example, the computing system can be used with various search key inputs as part of determining how a particular brand is being used by or associated with users of an online media collection. The computing system of one embodiment can operate to provide informational outputs that can be used for further searching, reporting, and/or display purposes. For example, the system can analyze aspects of any relevant media item including structuring identification boundaries in part to quantify media item content including providing complex query reporting features, as described further below.

In an embodiment, a system is configured to provide a service that scans through a collection of image information, such as embedded and unembedded photos and/or video, to identify relevant media items associated with a search reference, such as a reference image and/or phrase for example. For example, the service can utilize processing features that include optical character recognition (OCR) operations, image matching operations, and/or other identification features to identify textual information, persons, animals, and/or graphics associated with an uploaded image hosted on a computing network.

In one embodiment, the service includes a method of identifying persons in an image based in part on some association with a search reference or key used to identify a relevant or "matched" image (e.g., proximity/distance, adjacent to another image within the same collection (e.g., social group, etc.). For example, the service can operate to identify an image or video frame as being relevant if the text, person(s), and/or or graphics captured in the image or frame are determined to be relevant to a search reference or references representative of a known brand, logo, slogan or other source identifier. Once a media item is identified as being relevant, such as a video frame or image for example, the service can operate to extract and store any associated metadata, including demographic information about an item owner and/or other people or locations associated with the relevant media item.

Figure 1:
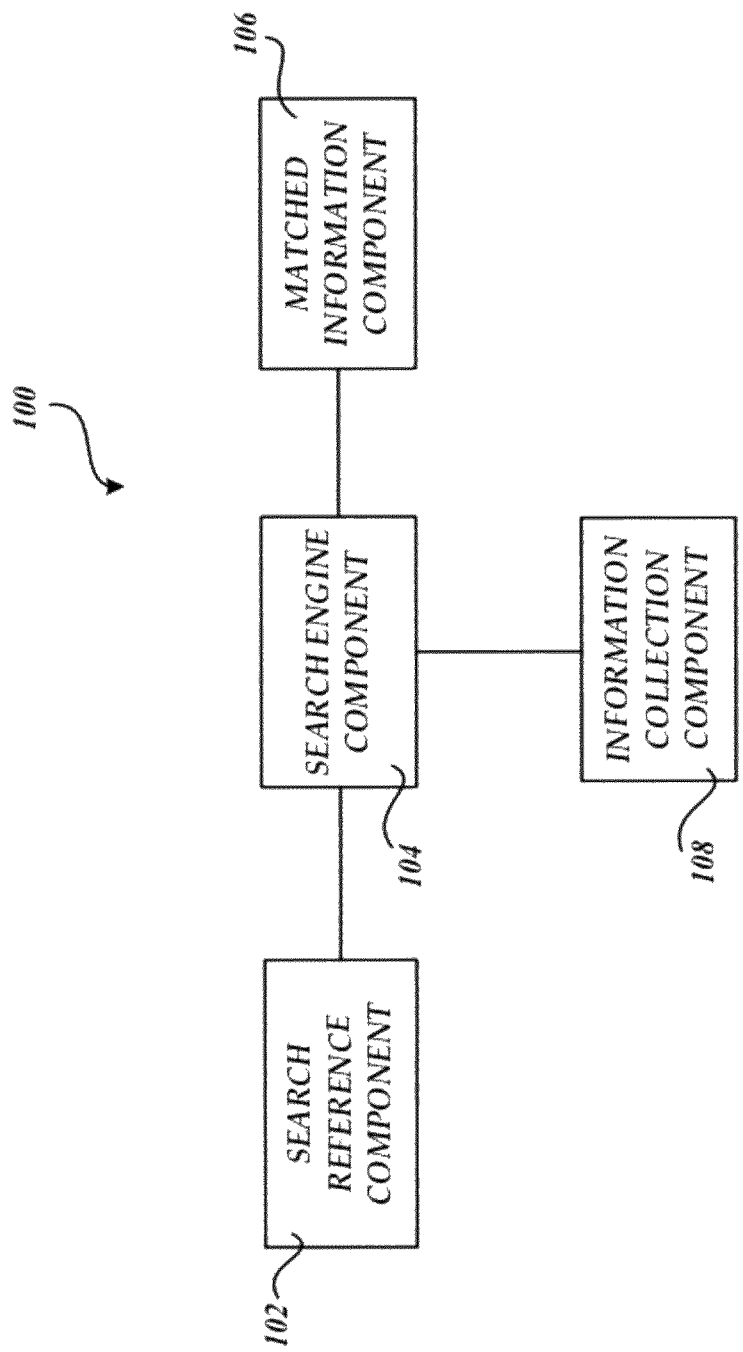
FIG. 1 is a block diagram of an exemplary computing environment.

FIG. 1 is a block diagram of an exemplary computing environment 100. Components of the exemplary computing environment 100 include functionality to provide comparative processing, reporting, and/or presentation features based in part on the use of a particular source or other identifier, but is not so limited. In an embodiment, components of the environment 100 can be used to identify relevant images of an online site collection that include some source identifier, such as a trademark design or word mark, brand, logo, slogan, emblem, graphical representations, and/or other potential good-will identifiers.

As shown in FIG. 1, the environment 100 of an embodiment includes a search reference component 102, a search engine component or search engine 104, a matched information component 106, and/or an information collection component or information collection 108, but is not so limited. An exemplary computing environment 100 includes processing, memory, software, and/or other components and features. The search engine 104 uses search keys that can be accessed from the search reference component 102, and/or submitted directly with a search request, to identify relevant data representations, including images and image portions, files and file portions, and other data representations capable of including all or a portion of a utilized search key.

The search engine 104 can operate to return information associated with each relevant search result based in part on an associated search key, as discussed further below. For example, as part of understanding how certain products are being used, a business can upload reference images of any relevant logos, slogans, etc. to use as part of searching a media collection that includes, image files and portions thereof, video files and portions thereof, still images, audio, and other data representations. Reference images can be used by the search engine 104 in part to identify how a product or service is being used and/or perceived by individuals associated with the media collection, such as information collection 108.

The information collection 108 is not limited to any single component or repository and can include distributed and worldwide collections, such as repositories and hosted collections associated with the World Wide Web. As one example, a user can use a client, such as a browser application or operating system component to upload one or more images or files of interest, such as a brand logo depiction or product image as examples, as search references when policing use of intellectual property, such as a product trademark for example. The search engine 104 can use information contained in the search reference component 102 as part of locating relevant media items, but is not so limited.

In an embodiment, the search engine 104 uses one or more search keys or references as part of a search operation to identify one or more relevant media items stored with a repository of information that includes one or more data representations including video, images, data, and metadata. For example, the search engine 104 can use OCR, pattern matching, facial recognition, and other data and/or image processing methods to identify relevant media items that include all or some identifiable portion of a search key.

The search engine 104 of one embodiment operates to capture information associated with each relevant media item including metadata and associations with one or more individuals associated with the relevant media item. For example, the search engine 104 can retrieve profile information of any user associated with a relevant media item, including authoring users, tagged users, and/or identified users captured in the relevant media item. In one embodiment, the search engine 104 can operate to gather information associated with users who may be loosely connected to identified/tagged users. For example, based in part on a particular relevant media item or items, the search engine 104 can capture a list of all of the friends of a user who was identified in a relevant image. As another example, the search engine 104 can operate to capture a list of users who appear in the same photo album as a user who was tagged in a relevant image.

The search engine 104 can operate to associate each relevant media item, the captured information, and an associated search key, including storing each association or mapping and the captured information in a storage medium. In one embodiment, the search engine 104 can operate to define mappings between each relevant media item (or portions thereof), the captured information, and/or the search key so as to increase usage of storage by not requiring a relevant media item, profile data, and/or a search key to be stored multiple times. Alternatively, the search engine 104 can operate to store the captured information along with each relevant media item to some dedicated store, such a database server or other online or local resource for example.

As discussed further below, the search engine 104 can be used to locate relevant media items using aspects of a search key or reference and provide information, including profile and relational information, associated with individuals depicted in or associated with a relevant media item. In an embodiment, the search engine 104 can include filtering features to further refine a relevant media item search. For example, the search engine 104 can be initiated with parameters to filter an image searching process, such as only searching media files that contain people, only searching media files created in some time frame (e.g., last month, etc.), only searching media files from a specific geography, and/or only searching for specific search images, specific graphics, and/or specific search phrases. The search engine 104 can be used in conjunction with searching any repository of information and is not limited to any examples or embodiments described herein.

With continuing reference to FIG. 1, the search engine 104 of an embodiment uses a number of search references to locate relevant media items included with the media collection using one or more OCR and pattern recognition algorithms, identify relevant portions of each relevant media item based in part on each search reference, collect profile information for each individual depicted in each relevant media item, determine associations between each depicted individual and an associated search reference for each relevant media item, and store the associations for each relevant media item including the profile information and/or the associated search reference for some site collection or collection of site collections as examples.

In one embodiment, the search engine 104 uses a search key input, such as a reference image and/or phrase input to locate relevant media items. For example, the search engine 104 can use a reference image contained in an image reference database along with a reference phrase contained in a phrase reference database to identify individuals and their association with product brands which includes collecting information of individuals associated with each relevant image. Search image examples can include, but are not limited to, products, product logos, landmarks, sinage, and/or other identifying features. Physical object depictions of a media library can include depictions of an object as it would appear from multiple angles or in multiple orientations. Search phrase examples may include product logos that are written in alphanumeric characters, street signs, words on labels, or other text that appears in a media item.

An example of use of the search engine 104 illustrates some of the extensive capabilities. Assume that a company would like to understand the use of a certain product or brand by consumers. The company can upload images to the search reference component 102, a product label for example (see FIGS. 4 and 5 for example). One or more uploaded images can be used as reference search images. The company can also specify any words or phrases of interest to find. The specified words or phrases can also be stored in the search reference component 102 or submitted separately. One or more of the phrases can be used as search phrases.

In one embodiment, components of the environment 100 can use various known and developing OCR algorithms, pattern matching algorithms, and/or other processing techniques to scan through a data representation collection (e.g., media library of images and video) to locate relevant media items. Data representative of a two, three, or other dimensional scene can be scanned as part of identifying one or more company assets, such as a product line or brand. Exemplary formats used to store images in files include Graphic Interchange Format (GIF), Tag Image File Format (TIFF), Joint Photographic Experts Group (JPEG), Binary Interchange File Format (BIFF), Bitmap (bmp), etc. For example, the search engine 104 can be implemented to run on servers associated with a hosted social networking application that includes a media library containing an entire catalog of digital images uploaded by users of the social networking application.

As discussed above, the search engine 104 can operate to detect a match and/or specific relevance association between one or more previously uploaded images and/or concurrently submitted images. For example, if the search engine 104 identifies images having a match strength above a given threshold according to each implemented OCR algorithm, pattern matching algorithm, and/or other comparative processing technique, the search engine 104 records each "matched" image and the demographic information of users tagged in the image. Some social networking applications provide functionality that enables a user to tag users depicted in an image. The search engine 104 of one embodiment can compile the demographic information and matched images into a searchable database. For example, the company may want to see a collection of photos featuring a product in use by males, age 18-26 in California, Oregon and Washington, who list Sports as an interest. Moreover, a searching user can use information of a relevant image to drill down and elicit further knowledge. For example, as part of an interactive analytical experience using information provided by the search engine 104, the user can begin with a heatmap of states where a particular product or relevant image item appears, then opting to drill down using a location filter (e.g., west coast), then a gender filter (e.g., only males), then by age, etc.

In another embodiment, the search engine 104 builds a media library of information associated with uploaded images, video, and/or audio data representations for storage in the matched information component 106. The search engine 104 can associate the one or more user profiles with the uploaded images, video, and/or audio data representations under various circumstances including, but not limited to, an association for: a user that authored or uploaded a media item; a user identified in a media item (e.g., facial recognition, statistical image matching, etc.); a user tagged as appearing in a media item; a user that appears in another media item in some proximity to a specific media item (e.g., a user appears in another photo in the same online album, folder, or site collection); a user at the same geographic location at the time a media item was recorded, and/or other circumstances and conditions. A media library can be implemented as a collection of media files stored locally, and/or stored on a server and accessed via a network or networks.

In one embodiment, a user profile includes demographic information about a user including, but not limited to: age, current residence, current work address, occupation, title, interests, status, relationships, etc. In one embodiment, each media file includes and/or maps to metadata, such as a geographic location at which a media item was recorded or stored (e.g., geotagging, locator services/applications, etc.), the date and time of recording, and/or Exchangeable Image File (EXIF) data (e.g., camera make and model, shutter speed, flash, etc.). The matched information component 106 of one embodiment includes a database that contains information to report on media items in which a search image and/or search phrase was found. A record of one embodiment in the database can contain the relevant media items or a reference or mapping to the media item, and/or user profiles of all users found or tagged in the media file, or a reference or mapping thereto, for each search image and/or search phrase.

In an embodiment, components of the environment 100 provide a network-based service that operates to quickly identify relationships between one or more individuals and one or more objects included as part of a relevant media item which has been identified based in part on one or more reference search inputs. In some cases, relational information between individuals and/or objects can be reported, stored, and/or displayed. In one embodiment, a matched image can be stored to only include a relevant portion or portions of a media item identified as being relevant.

The search engine 104 of an embodiment can include functionality that operates to create boundary identifiers and/or associations for each identified individual and/or object captured in a relevant media item. Boundary identifiers can be constructed of different geometric dimensions, colors, and/or shapes. People matching boundary identifiers can be provided to identify users captured in a relevant media item. Object matching boundary identifiers can be provided to identify objects captured in a relevant media item. Object matching boundary identifiers can also be constructed of different geometric dimensions, colors, and/or shapes. Identified users and/or objects can be resolved using various processing and identification techniques in conjunction with the one or more search references. Image, image portions, and/or image portions of a data stream can be identified as being relevant for further searching and analysis.

In one embodiment, consideration of portions of boundary identifiers can be used to determine relevance of a user association with an object corresponding to some reference key, such as a preference for a certain product brand or type for example. Boundary portions (e.g., points and locations) can also be used to determine relative distances between one or more identified individuals and identified objects. For example, overlapping boundary identifiers can be used to determine physical handling of a product by a user. Certain boundary associations can be examined for degrees of relatedness (e.g., highly relevant, relevant, somewhat relevant, irrelevant, etc.). Further data and metadata can be retrieved regarding relationships between people matching boundary identifiers for various users to determine relevance associations with a relevant object, some other object, another individual, and/or some other media item. Certain default textual information and/or user configurable information can be reported and/or displayed to provide informative information to some searching or discovering user.

An exemplary computing system includes suitable programming means for operating in accordance with a method of identifying relevant media items and determining various associations therewith. Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

Figure 2:
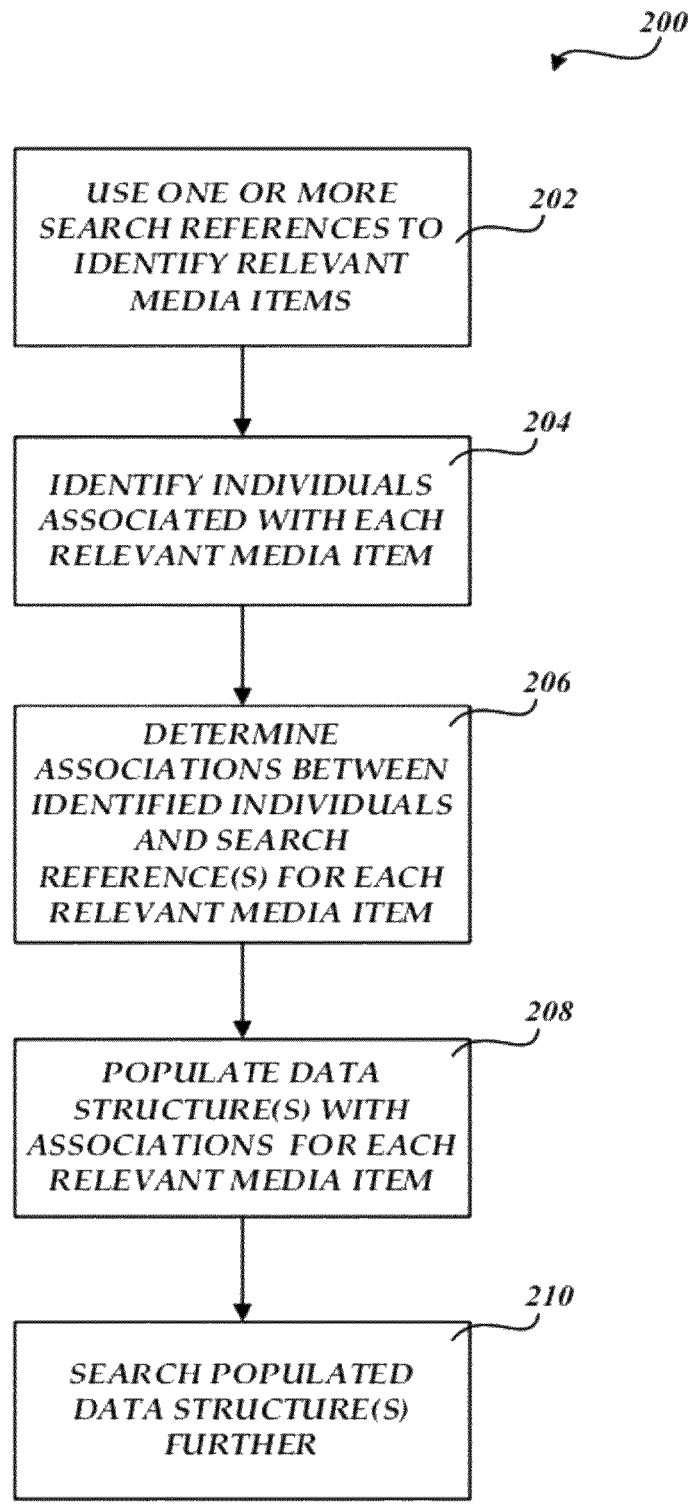
FIG. 2 is a flow diagram illustrating an exemplary process.

FIG. 2 is a flow diagram illustrating an exemplary process 200. In an embodiment, the process 200 includes functionality to provide identification, reporting, and/or other services, including identifying data representations that include an association of one or more individuals and one or more search references or keys, but is not so limited. While a certain number and order of operations is described for the exemplary flow of FIG. 2, it will be appreciated that other numbers and/or orders can be used according to desired implementations.

At 202, the process 200 uses one or more search images as input references as part of identifying relevant media items included as part of a media collection or other repository. For example, a service customer can upload one or more graphical, textual, image, and/or other search key parameters as part of determining usage or association of a particular service or product by users of an online social networking collection. The uploaded search key parameters can be used to identify relevant media items contained in the collection, along with individuals associated with each relevant media item, such as individuals depicted in an image having some relation to an object or objects associated with a search key of interest. As an example, a customer can upload brand images and text as part of identifying relevant images associated with a particular brand as part of a marketing research program. In one embodiment, the process 200 at 202 operates to refer to a search key site collection, grouped by customer, brand, or some other criteria for example, to identify particular search keys to be used in a searching and/or identification procedure.

At 204, the process 200 operates to identify individuals associated with each relevant media item. For example, the process 200 can operate to identify users who have been tagged in a relevant image, authored a relevant image, identified in a relevant image, and/or otherwise depicted or portrayed in a relevant image. As part of identification operations, the process 200 of various embodiments can operate to scan for relevant search images by employing various image matching algorithms to determine if a search image or key, or some portion, is present in a given media item. For example, the process can use an image matching algorithm to determine if a brand logo or some portion thereof is depicted in a JPEG or other file. The process 200 can use configurable and parameterizable algorithms such that a searching user can optionally set confidence thresholds for accepting matching items.

As part of a comparative analysis, algorithms utilized by the process 200 can also employ techniques to partially match images or image portions, such as facial and/or skeletal features; to adjust media files for lighting conditions, orientation, focus, perspective, etc.; to pre-filter images of an image, and/or pre-compile media items before attempting to identify a search image as being "matched" or relevant. The process 200 can also use OCR techniques and/or helper algorithms to determine if a search phrase is present in a given media item. In an alternate embodiment, the process 200 can operate to record any and all text discovered during an OCR process, regardless if that text is present in a designated search phrase database.

At 206, the process 200 operates to determine associations between any individual and one or more search references associated with each relevant media item. For example, the process 200 can be used to identify whether a depicted individual is holding or near a product or other person associated with a search key product label. Depending in part on each an association, the process 200 can provide further information to searching customers including the use of a particular product by identified or tagged individuals, which can provide important evidence when managing marketing and policing of a brand.

The process 200 of one embodiment includes the use of a bounding or delineation process to determine relationships between individuals and objects associated with each search reference. For example, the process 200 can use pattern matching and feature recognition algorithms to bound and identify each individual's head and/or other body portion and each product or label associated with a particular search key using various geometrical boundaries (e.g., ovals, squares, rectangles, free-form, etc.), colors, lead lines, etc. The process 200 can use the boundaries, including points distributed throughout, to capture and quantify relational aspects of depicted users and an associated search key (see FIGS. 6 and 7). As one example, the process 200 can use formed boundaries to identify physical proximity between some depicted product and a tagged individual, such as using nearest boundary point comparisons as quantifying physical proximities or other relationships.

At 208, the process 200 operates to store associations for each relevant media item in one or more data structures. For example, the process 200 can store mappings between search keys, individual profile information, and/or identified images, along with any bounding information and/or determined relational information. In one embodiment, the process 200 at 208 operates to store a relevant media item, such as an image identified as being a match with a search key for example, along with metadata associated with individuals depicted in the relevant media item, such as profile information for example, and an associated search key, such as a reference image and/or phrase for example. In another embodiment, the process 200 at 208 operates to store mappings between each relevant media item and any associated search keys, along with metadata associated with individuals depicted in the relevant media item. At 210, the process 200 operates to search populated data structures to discover further information regarding use of a particular product and/or service associated with a particular search reference. Other embodiments are available.

Figure 3:
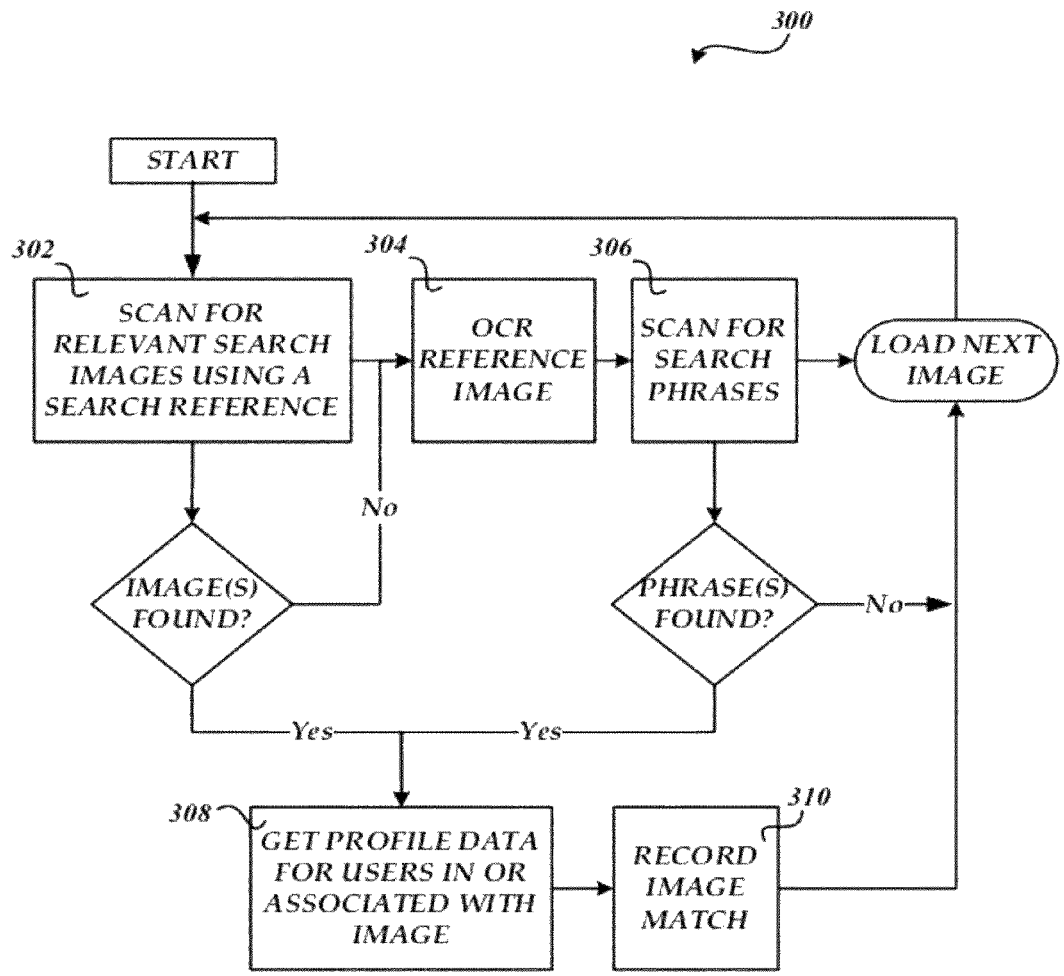
FIG. 3 is a flow diagram illustrating an exemplary process.

FIG. 3 is a flow diagram illustrating an exemplary process 300. The process 300 of an embodiment includes functionality to associate search keys with relevant media items, including individuals associated with the relevant media items, but is not so limited. For example, the process 300 can use input search images of product and/or service brands to identify media items including brand identifiers associated with products and/or services of interest. While a certain number and order of operations is described for the exemplary flow of FIG. 3, it will be appreciated that other numbers and/or orders can be used according to desired implementations.

At 302, the process 300 operates to scan through a media collection to identify relevant search images of some image or file collection using one or more reference search images, such as a logo image, a design image, a product photo, a graphical rendering, a brand image, etc. At 304, the process 300 uses an OCR process to extract a word or phrase from one or more search images. At 306, the process 300 operates to scan through the media collection to identify relevant search phrases including words and/or phrases extracted from a search image. In one embodiment, the process 300 can use one or more serving components to process an incoming search image as part of identifying relevant images included as part of a hosted image collection.

The process 300 of one embodiment can refer to and use a dedicated store for each customer that includes relevant search image and/or phrase references to be used as part of monitoring uses of and/or associations with a particular intellectual property (IP) asset, such as a trademark associated with a product brand or label as one example. Each customer or user can periodically update a dedicated search image database and/or search phrase database associated with media collection to delete search references or to include new and/or modified search images and/or phrases to use when scanning files of a media collection.

At 308, the process 300 operates to collect profile information of any user included in and/or associated with a relevant search image. For example, the process 300 can obtain profile information using an online directory service and/or data structure for users tagged in the relevant search image, an author or owner of the relevant search image, and/or users depicted in other images associated with the relevant search image. At 310, the process 300 operates to record each relevant search image or its location in a site collection, and any associated information in an image match repository. The image match repository can be searched to uncover additional information regarding use and/or association of a particular search image and any identified user.

The image match repository can be used by the process 300 in part to quantify relationships between depicted users and an asset or assets associated with a reference search image and/or phrase. The process 300 of one embodiment includes the use of a bounding algorithm and rendering to identify individuals and objects associated with each search reference for display. For example, the process 200 can use image processing features to bound each individual's head and hands along with bounding each product or label associated with a particular search key. Lead lines and identifying labels (see for e.g., FIGS. 6 and 7) can be used to point to and quantify each bounded individual and object.

The process 300 can include calculation and use of boundaries, including points distributed throughout, to determine relationships between depicted users and associated objects corresponding with an associated search key. As an example, the process 300 can use calculated boundaries to identify physical proximity between some depicted product and individual by using boundary point comparisons to determine degrees of proximity or other relationships. As further example, the process 300 can use a reference boundary of a given size (including estimates) to calculate a real-world proximity estimate between a person and a product. For example, using known identification methods to detect a person's head in a relevant photograph with a search reference, and using an average head size as a parameter, the process 300 can calculate the distance between any two objects in the photograph, including the search reference and the person's head, assuming a relatively flat focal plane. Other embodiments are available.

Figure 4:
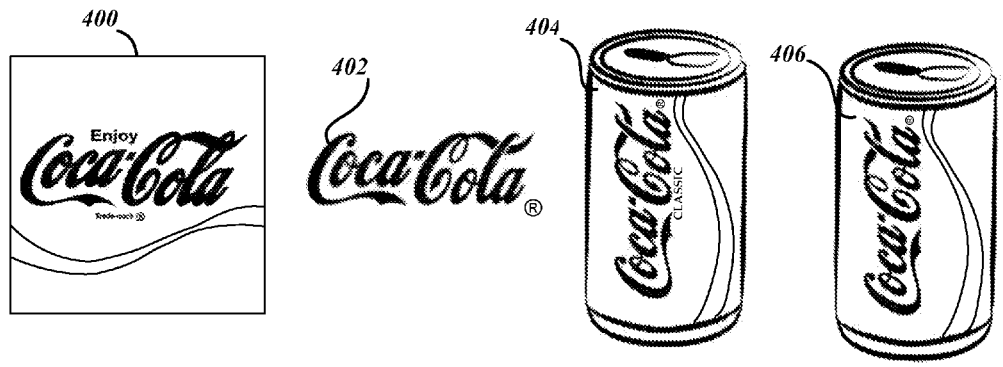
FIG. 4 depicts a number of exemplary reference search images or keys.

FIG. 4 depicts a number of exemplary reference search images or keys 400-406. In an embodiment, reference search image and/or phrase keys can be used as part of a searching and identification process which includes an assessment of associations between objects and individuals of a relevant media item, such as an image or portion of a data stream for example. In one embodiment, each reference search image and/or a word mark can be associated with a particular product or service and/or a source of the product or service brand. As described above, reference graphics, reference photos, reference scans of pictures, etc. of a product or service can be also be used as reference search images. All or some portion of a reference search image can be used to identify and locate relevant media items.

As one example, the COCA COLA company or some agent can submit the search images 400-406 as part of registering for a service that operates to identify items of a media collection, including images and video that may be relevant to a particular business plan or marketing program. For example, the search images 400-406 can include different color schemes, graphics, and/or fonts as part of obtaining an expansive relevance search to identify relevant media items that include depicted users and a product and/or service associated with one or more of the search images 400-406. A registered user may also submit search images and/or phrases of one or more competing, affiliated, and/or franchised companies as part of uncovering use or association of a particular brand, including characteristics of an associated user for further searching purposes.

Figure 5:
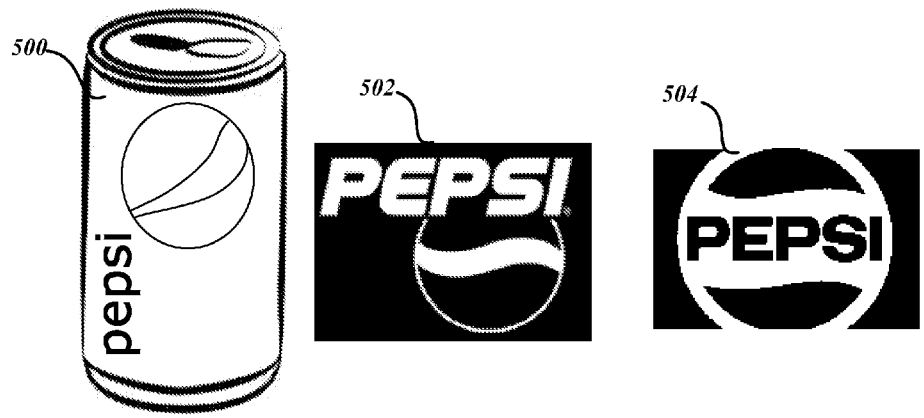
FIG. 5 depicts a number of exemplary reference search images or keys.

FIG. 5 depicts a number of exemplary reference search images or keys 500-504. In an embodiment, reference search image and/or phrase keys can be used as part of a searching and identification process which includes an assessment of associations between objects and individuals associated with a relevant media item, such as an image or portion of a data stream for example. In one embodiment, each reference search image and/or a word mark can be associated with a particular product or service brand and a source of the product or service brand. All or some portion of a reference search image can be used to identify and locate relevant media items.

As another example, the PEPSI company or some agent can submit the search images 500-504 as part of registering for a service that identifies items of a media collection, including images and video that may be relevant to a particular search request. For example, the search images 500-504 can include different color schemes, graphics, and/or fonts as part of obtaining an expansive relevance search to identify relevant media items that include depicted users and a product and/or service associated with one or more of the search images 500-504.

A registered user may also submit search images and/or phrases of one or more competing, affiliated, and/or franchised companies as part of uncovering use of or association with a particular brand and characteristics of any associated user for further searching purposes. Exemplary images could include all or a portion a university logo, a team logo, and other source identifying indicia. For example, a brand identifiers can be used in part to identify brands, logos, emblems, and/or other relevant image portions already captured in use in photos on social networking sites. Dedicated search and/or identification servers can be integrated into each collection and used by registered users for example.

Figure 6:
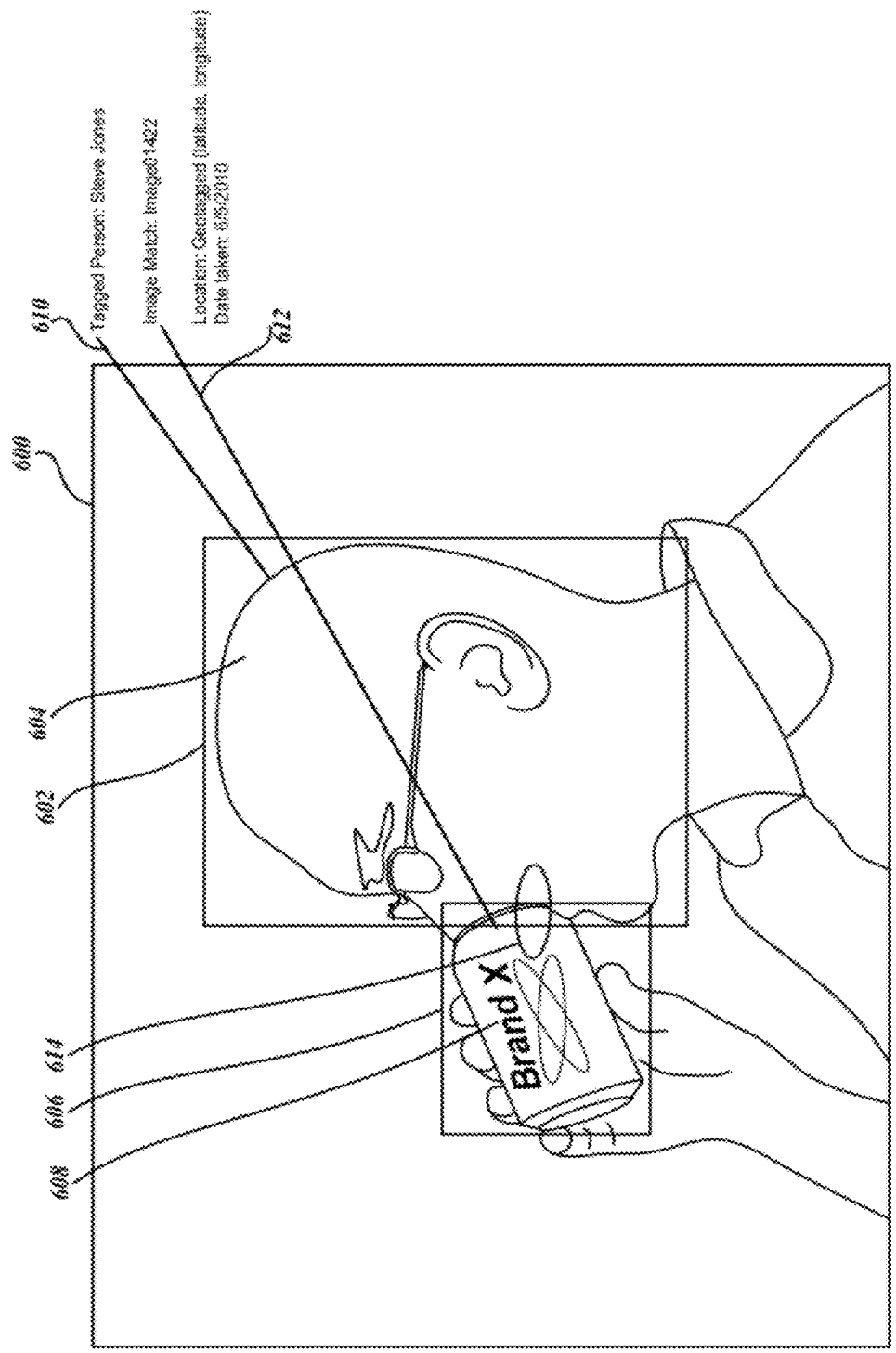
FIG. 6 is a display of an exemplary matched image including graphical and textual enhancements.

FIG. 6 is a display of an exemplary matched image 600 including graphical and textual enhancements, as discussed below. In an embodiment, a network-based service enables users to quickly identify relationships between one or more individuals and one or more objects included as part of a relevant media item. In some cases, relational information between individuals and/or objects can also be reported and/or displayed. As shown, as part of a searching and identification process, a relevant result display includes a matched image 600. In one embodiment, a matched image can be stored to only include a relevant portion or portions of a media item identified as being relevant.

As shown in FIG. 6, a first matching boundary identifier 602 has been provided to identify user 604, and a second matching boundary identifier 606 has been provided to identify an object 608 associated with the one or more search keys. As discussed above, the identified user 604 and/or object 608 can be resolved using image processing and other identification techniques in conjunction with the one or more search keys (e.g., search images similar to FIGS. 4 and 5). An image or images or portions of a data stream can be identified as a relevant media item or items (e.g., matched image 600) for further searching and analysis.

In one embodiment, consideration of portions of boundary identifiers can be used to determine relevance of a user association with an object corresponding to some reference key, such as a preference for a certain product or service brand or type for example. For example, overlapping boundary identifiers can be used to determine physical handling of a product by a user. Boundary portions can also be used to determine relative distances between one or more identified individuals and identified objects.

Lead lines 610 and 612 are provided that point to the first matching boundary identifier 602 and second matching boundary identifier 606, respectively. Certain default textual information can be reported and/or displayed with each lead line to provide informative information to some searching or discovering user. In one embodiment, a searching user can configure the textual display to select other categories and/or types of identification information. For example, a user can select other profile attributes to be reported and displayed with a matched image.

As shown, user 604 has been identified as being a tagged person "Steve Jones". Object 608 has been identified as matching reference image Image01422. For this example, geotagging and time of recording information has been collected and/or displayed. While certain exemplary descriptive portions are shown, it will be appreciated that other textual description portions can also be included and populated with matched image data depending in part on an amount of information to be provided for each customer or user.

Figure 7:
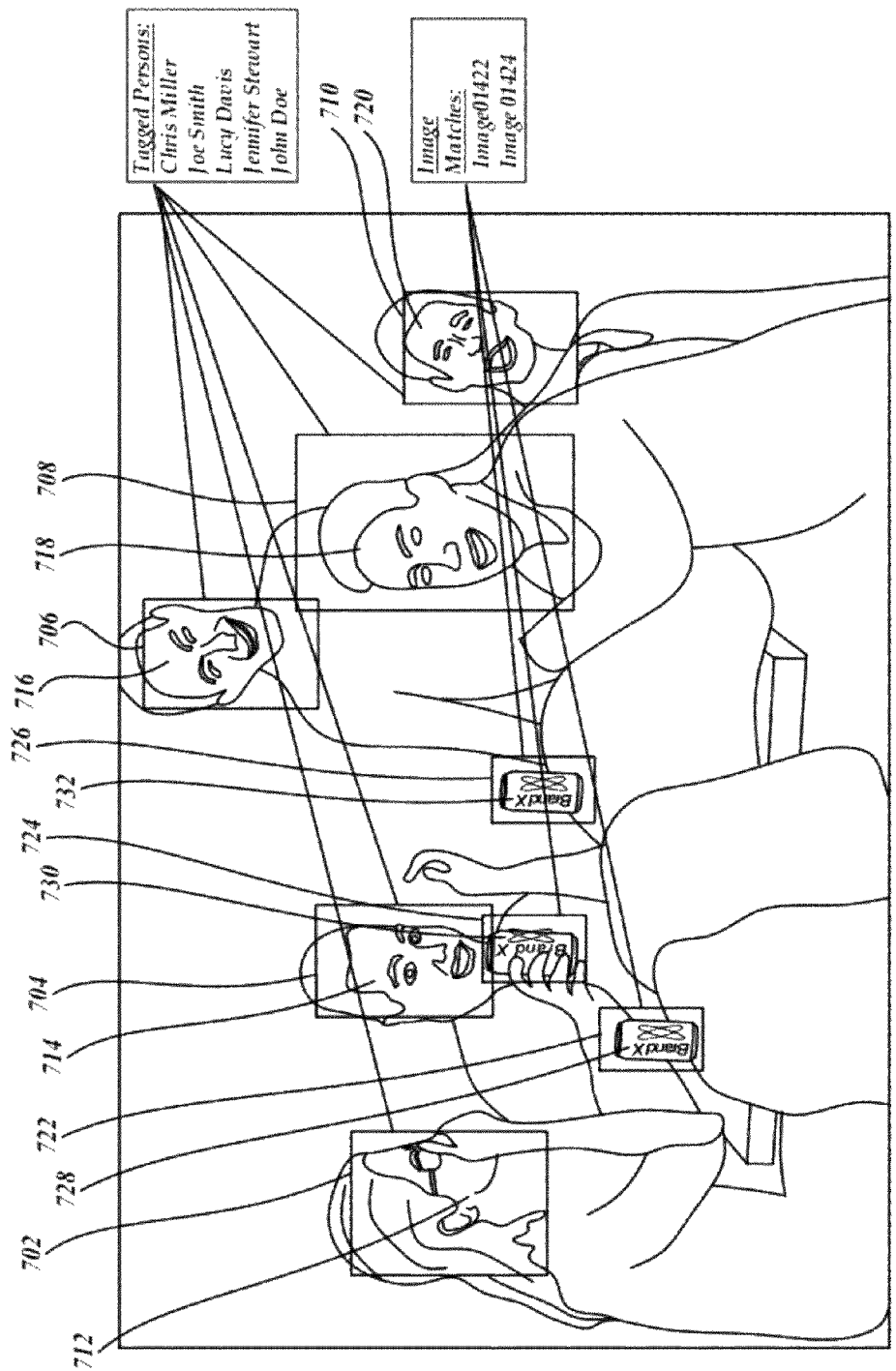
FIG. 7 is a display of an exemplary matched image including graphical and textual enhancements.

FIG. 7 is a display of an exemplary matched image 700 including graphical and textual enhancements, as discussed below. In an embodiment, a network-based service enables users to quickly identify relationships between one or more individuals and one or more objects included as part of a relevant media item and/or search key or keys. In some cases, relational information between individuals and/or objects can also be reported and/or displayed. As shown, as part of a searching and identification process, a relevant result display includes a matched image 700. In one embodiment, a matched image can be stored to only include a relevant portion or portions of a media item identified as being relevant.

As shown in FIG. 7, matched image 700 includes people matching boundary identifiers 702-710. People matching boundary identifiers 702-710 of one embodiment can be constructed of different geometric dimensions and/or shapes based in part on a location of a depicted individual and/or image recorder or owner. People matching boundary identifiers 702-710 have been provided to identify users 712-720. Object matching boundary identifiers 722-726 have been provided to identify objects 728-732 associated with the one or more search keys. Object matching boundary identifiers 722-726 can also be constructed of different geometric dimensions and/or shapes. As discussed above, the identified users 712-720 and objects 728-732 can be resolved using image processing and other identification techniques in conjunction with the one or more search keys. An image or images or portions of a data stream can be identified as a relevant media item or items (e.g., matched image 700) for further searching and analysis.

In one embodiment, consideration of portions of boundary identifiers can be used to determine relevance of a user association with an object corresponding to some reference key, such as a preference for a certain product brand or type for example For example, overlapping boundary identifiers can be used to determine physical handling of a product by a user. Boundary portions can also be used to determine relative distances between one or more identified individuals and identified objects.

As shown in FIG. 7, people matching boundary identifier 704 and object matching boundary identifier 724 are overlapping and can be tagged as a highly relevant user association for example. People matching boundary identifier 702 and object matching boundary identifier 722 are not overlapping but can be associated based on proximity comparisons and a somewhat relevant user association can be tagged for user 712 and object 728. People matching boundary identifiers 710 associated with user 720 does not appear to be associated with an object matching boundary identifier and can therefore can be tagged as less relevant according to some relevance scale.

Further data can be retrieved and/or ascertained regarding relationships between people matching boundary identifier 706 for user 716 and people matching boundary identifier 708 for user 718 to determine relevance associations with object 732 or some other object. Certain default textual information can be reported and/or displayed with each lead line to provide informative information to some searching or discovering user. In one embodiment, a searching user can configure the textual display to select other categories and/or types of identification information. For example, a user can select other profile attributes to be reported and displayed with a matched image.

As shown, the users 712-720 have been identified as being tagged persons "Chris Miller", "Joe Smith", "Lucy Davis", "Jennifer Stewart", and "John Doe". Objects 728-732 have been identified as matching two reference images: Image01422 and Image01424. While certain exemplary identifiers are shown, it will be appreciated that other identifying information can be captured and populated with matched image data depending in part on an amount and/or type of information provided. Other embodiments are available.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The term computer readable media as used herein may also include communication media. Communication media may be embodied by computer readable instructions, data structures, program modules, or other data in a modulated data signal, such as a carrier wave or other transport mechanism, and includes any information delivery media. A modulated data signal may describe a signal that has one or more characteristics set or changed in such a manner as to encode information in the signal. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 8:
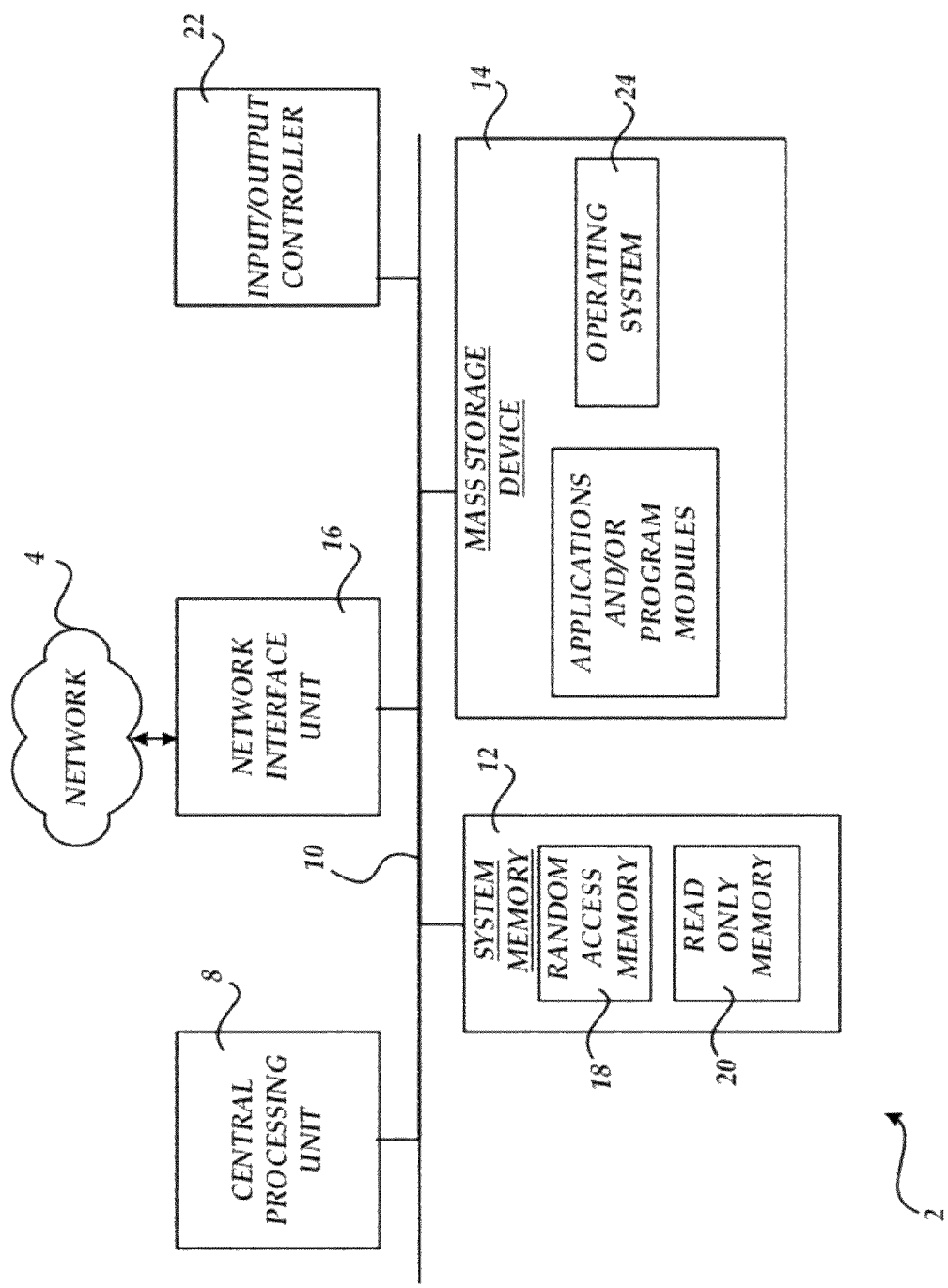
FIG. 8 is a block diagram illustrating an exemplary computing environment for implementation of various embodiments described herein.

Referring now to FIG. 8, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 8, an illustrative operating environment for embodiments of the invention will be described. As shown in FIG. 8, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
using a search key comprising a search image as a searching reference as part of a search operation;
searching a repository of information that includes one or more data representations including video and image data and metadata using the search key comprising the search image to identify one or more relevant media items including relevant images and video, each relevant media item including a portion corresponding to the search key;
capturing information associated with each relevant media item including data and metadata associated with one or more individuals associated with each relevant media item;
associating each relevant media item and captured information with the search key including using one or more people matching boundary identifiers to identify the one or more individuals associated with each relevant media item and one or more object matching boundary identifiers to identify one or more objects associated with each relevant media item and using boundary point comparisons between the one or more people matching boundary identifiers and the one or more object matching boundary identifiers to determine associations between the one or more individuals and the one or more objects;
identifying importance of a user association with a product or service based in part on a boundary point evaluation between one or more bounded individuals and a bounded object associated with the search key captured in the relevant media;
identifying importance of a user association with a product brand based in part on a physical proximity defined in part by distance between a first boundary point associated with a tagged individual and a second boundary point associated with the bounded object;
retrieving user profile information for a user tagged as appearing in each relevant media item, a user identified in each relevant media item, and an authoring or uploading user of each relevant media item; and,
storing each association in storage.

2. The method of claim 1, further comprising associating multiple search keys including image, graphical, and textual references with one or more of a relevant video, image, and a portion of a data stream.

3. The method of claim 1, further comprising identifying the one or more individuals associated with each relevant media item depicting all or some portion of an object associated with the search key and bounding each individual with a first boundary identifier and each object with a second boundary identifier for further analysis.

4. The method of claim 3, further comprising collecting the user profile information associated with the one or more individuals, including tagged and identified individuals for relevance evaluations that include the use of a plurality of boundary identifiers to quantify relationships between each bounded user and each bounded object.

5. The method of claim 1, further comprising identifying and storing information of each relevant media item including profile information of the authoring user, the uploading user, a recognized individual, and a tagged individual using image matching and other processing operations.

6. The method of claim 5, further comprising identifying and storing information of each relevant media item including profile information of one or more tagged individuals identified as appearing in the relevant media item, an individual appearing in a different media item relative to the relevant media item, and an individual at a same geographic location at the time the media item was recorded.

7. The method of claim 1, further comprising associating a matched image with the search key and storing the captured information in one or more of local and remote storage, including defining mappings between the captured information and the matched image.

8. The method of claim 1, further comprising using the search key that includes one or more reference images comprising a brand identifier, name, trade name, logo, slogan, and a design scheme, the search operation providing information that can be used in part as part of a good-will assessment in conjunction with association of the search key and an associated user.

9. The method of claim 1, further comprising using a database to store information when reporting information of relevant media items that correspond with a search image, a search sound, and search phrase, the database including records that include one of a media file and a reference to the media file, and retrievable or referenced user profile information of found or tagged users.

10. The method of claim 1, further comprising using the search key that includes using the search image to identify the one or more relevant media items and a search phrase, wherein the search phrase is provided using an optical character recognition (OCR) process on the search image.

11. A system comprising:
a storage medium that includes a media collection;
processing resources; and
a computer-implemented search component that uses a number of search references to:
locate relevant media items included with the media collection using one or more character recognition and pattern recognition algorithms;
identify relevant portions of each relevant media item based in part on each search reference;
determine user profile information for each individual tagged as appearing in each relevant media item, each individual identified in each relevant media item, and an authoring or uploading user associated with each relevant media item;

associate the user profile information with each relevant media item;

determine relevance associations between each individual and an object associated with each search reference for each relevant media item including using people matching boundary identifiers to identify individuals associated with each relevant media item and one or more object matching boundary identifiers to identify one or more objects associated with each relevant media item and using boundary point comparisons between the people matching boundary identifiers and the one or more object matching boundary identifiers to determine associations between the individuals and the one or more objects;

identify importance of a user association with a product or service based in part on a boundary point evaluation between one or more bounded individuals and a bounded object associated with the search reference captured in the relevant media;

identify importance of a user association with a product brand based in part on a physical proximity defined in part by distance between a first boundary point associated with a tagged individual and a second boundary point associated with the bounded object; and store the relevance associations for each relevant media item.

12. The system of claim 11, wherein the search component uses the number of search references to associate multiple search image references, including graphical and textual representations, included in an image or image set.

13. The system of claim 11, wherein the search component collects one or more of demographic, geographic, and temporal information associated with each relevant media item.

14. The system of claim 11, wherein the search component uses OCR and image matching features to identify aspects of a search key contained in a relevant image including product names, brands, logos, and emblems as part of identifying a particular asset.

15. A computer storage medium memory which stores encoded instructions used in part to provide searching services by:

using a search key that includes all or some portion of a reference image to identify relevant data representations that include one or more associated individuals and an object associated with the search key;

retrieving user profile information of each associated individual with each relevant data representation including each identified individual of each relevant data representation, each authoring or uploading user of each relevant data representation, and each user tagged as appearing in each relevant data representation identified using the search key;

referencing the user profile information with each relevant data representation;

determining an association between each associated individual and the search key using bounded identifying portions with each relevant data representation including using one or more people matching boundary identifiers to identify one or more individuals associated with each relevant media item and one or more object matching boundary identifiers to identify one or more objects associated with each relevant media item and using boundary point comparisons between the one or more people matching boundary identifiers and the one or more object matching boundary identifiers to determine associations between the one or more individuals and the one or more objects;

identifying importance of a user association with a product or service based in part on a boundary point evaluation between one or more bounded individuals and a bounded object associated with the search key captured in the relevant media;

identifying importance of a user association with a product brand based in part on a physical proximity defined in part by distance between a first boundary point associated with a tagged individual and a second boundary point associated with the bounded object; and storing each association for each relevant data representation.

16. The computer storage medium memory of claim 15 which stores encoded instructions to identify physical relationships between tagged individuals and an object associated with the search key.

17. The computer storage medium memory of claim 15 which stores encoded instructions to identify behavioral aspects of depicted individuals and an object associated with the search key.

18. The computer storage medium memory of claim 15 which stores encoded instructions to delineate identification boundaries for each identified individual and an object associated with the search key, and store one of demographic, geographic, and temporal information of a relevant image of a hosted image collection.

* * * * *